Jan. 12, 1926. 1,569,234
F. MÜLLER
CHAIN AND PARTS THEREFOR
Filed Nov. 9, 1923 2 Sheets-Sheet 1

Jan. 12, 1926.  
F. MÜLLER  
1,569,234  
CHAIN AND PARTS THEREFOR  
Filed Nov. 9, 1923   2 Sheets-Sheet 2

INVENTOR.
Friederich Müller
BY Gifford, Bull & Scull
his ATTORNEYS.

Patented Jan. 12, 1926.

1,569,234

UNITED STATES PATENT OFFICE.

FRIEDERICH MÜLLER, OF ELIZABETH, NEW JERSEY, ASSIGNOR TO THE WHITNEY MFG. CO., OF HARTFORD, CONNECTICUT, A CORPORATION OF CONNECTICUT.

CHAIN AND PARTS THEREFOR.

Application filed November 9, 1923. Serial No. 673,655.

*To all whom it may concern:*

Be it known that I, FRIEDERICH MÜLLER, a citizen of the United States, and resident of Elizabeth, in the county of Union and State of New Jersey, have invented certain new and useful Improvements in Chains and Parts Therefor, of which the following is a specification.

My invention relates to link chains of the silent type and consists of certain novel parts and combinations of parts which render the chain efficient, durable and noiseless in operation, which novel parts and combinations will be specifically described herein and pointed out in the appended claims.

Figure 1:
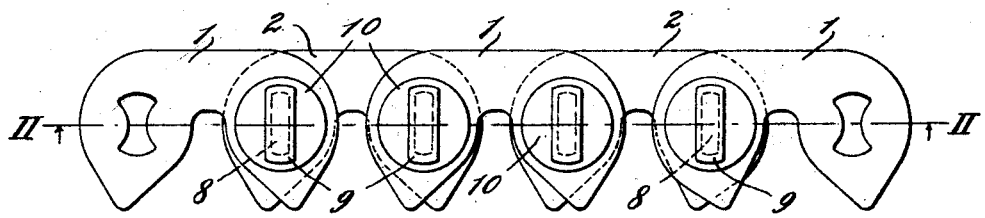
Figure 2:
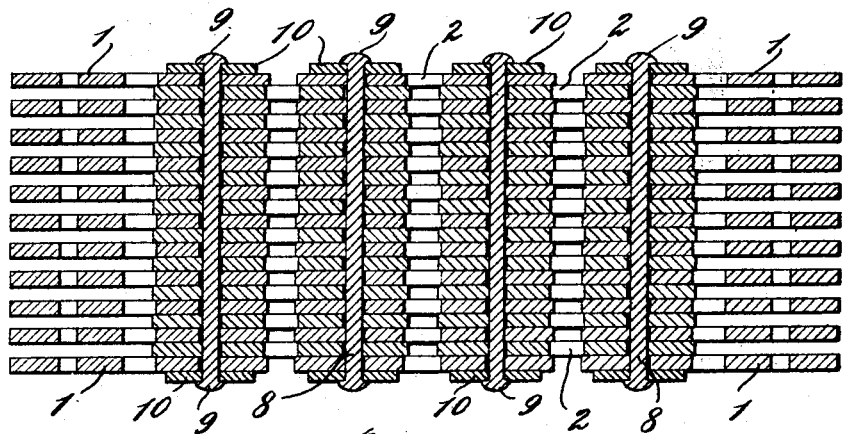
Figure 3:
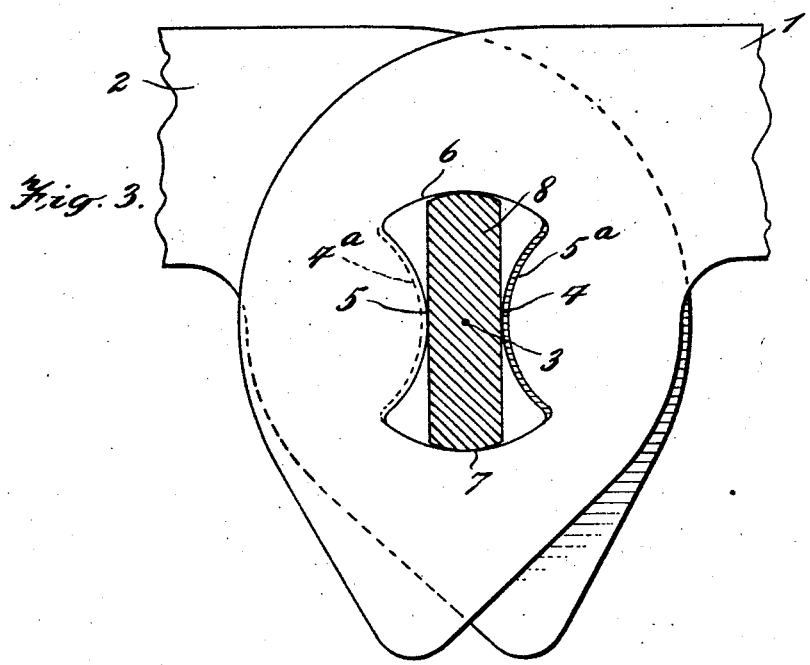
Figure 4:
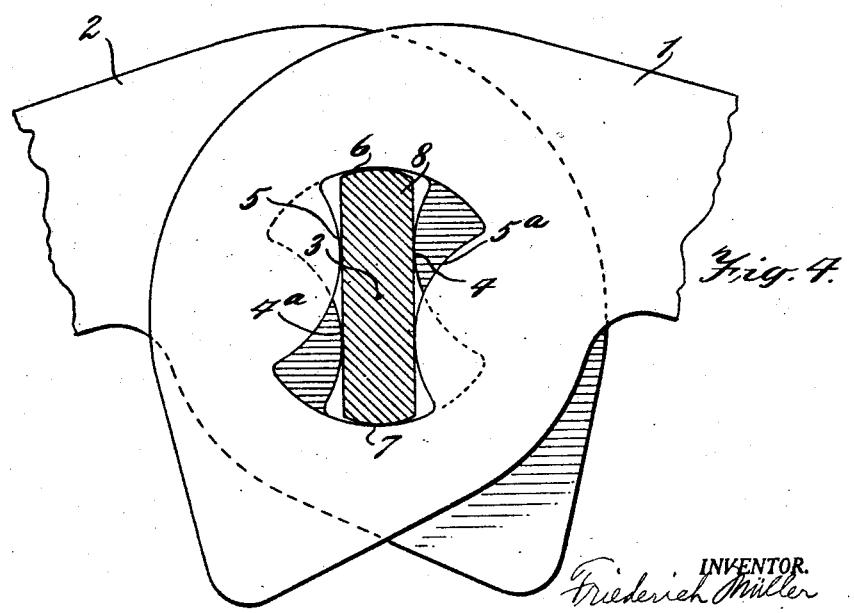

My invention will be better understood by reading the following description taken in connection with the accompanying drawings showing one embodiment thereof and in which Fig. 1 is a side view of a portion of a chain containing one embodiment of my invention; Fig. 2 is an inverted sectional view taken on the plane of the line II—II of Fig. 1; Fig. 3 is a sectional elevation shown in the joint between adjacent pitches on a straight run of the chain and Fig. 4 is a view similar to Fig. 3 with the joint flexed.

Referring to the drawings, the chain consists of a series of links 1 and a series of similar links 2 with their ends overlapping the ends of the links 1. The links 1 and 2 have openings through their ends which register in the overlapped ends of the links. The openings in the individual links flare outwardly from the pivotal center 3 of the link joint and have segmental sides 4 and 5 and segmental ends 6 and 7. Pins 8 are placed through the openings in the overlapped ends of the links and the segmental side 5 of the links 1 and the corresponding segmental side 5ª of the links 2 engage the opposite sides of the pins 8. The clearance space is provided between the side of the pin and the sides 4 and 4ª of the links to allow for the flexing of the joint, as will be readily understood by reference to Figs. 3 and 4. It will be noted that the sides 4 and 5 of the links are segments of a circle, whose center is on the center line of the chain; that is to say, a straight line passing through adjacent pivotal centers 3.

The longitudinal axes of the openings in the ends of the links are perpendicular to the center line of the chain and the openings are symmetrical with respect to the pivotal centers; consequently, the ends of the links may be interchangeable in the assembly of the links into a chain. This has many advantages in the manufacture of chains by automatic machinery, as compared with links having openings of such shape and arrangement that the ends of the links are not interchangeable.

The pins 8 have flat parallel sides. The edges of the pins are slightly round but the cross section of the pins is substantially rectangular in shape. This has a decided advantage in the manufacture of chains, because of the simplicity of the form of pin and the cheapness of manufacture. Pins of this simple shape may be made by merely rolling them from round stock to the shape shown. The ends of the pins are riveted over, as shown at 9 in Fig. 2. As shown in Figs. 1 and 2, washers 10 are placed on the ends of the pins before they are riveted but if desired, these washers may be omitted and the pins riveted over against the outside links 1.

Other slight changes may be made without departing from the spirit of my invention.

I claim:

1. In a chain of the silent link type, a plurality of overlapping links, elongated openings through the ends of said links, having segmental sides and ends and a flat pin with parallel sides in said openings.

2. In a chain of the silent link type, a plurality of overlapping links, elongated openings through the ends of said links having segmental sides and ends and a pin with parallel sides and rounded edges in said openings.

3. In a chain of the silent link type, a plurality of overlapping links, elongated openings through the ends of said links having segmental sides and ends, pins having flat parallel sides in said openings, there being a clearance space between said sides and pin to permit a rolling movement between said pins and links when said joint is flexed.

4. A pin for silent link chains having flat parallel sides.

5. A pin for silent link chains having flat parallel sides and being substantially rectangular in cross section.

FRIEDERICH MÜLLER.